US010385461B2

(12) United States Patent
Mokhtarifar et al.

(10) Patent No.: US 10,385,461 B2
(45) Date of Patent: Aug. 20, 2019

(54) FUNCTIONALIZATION OF CARBON-BASED NANOMATERIALS

(71) Applicants: Maryam Mokhtarifar, Mashhad (IR); Hamed Arab, Mashhad (IR); Morteza Maghrebi, Mashhad (IR); Majid Baniadam, Mashhad (IR)

(72) Inventors: Maryam Mokhtarifar, Mashhad (IR); Hamed Arab, Mashhad (IR); Morteza Maghrebi, Mashhad (IR); Majid Baniadam, Mashhad (IR)

( * ) Notice: Subject to any disclaimer, the term of this patent is extended or adjusted under 35 U.S.C. 154(b) by 330 days.

(21) Appl. No.: 15/459,122

(22) Filed: Mar. 15, 2017

(65) Prior Publication Data

US 2017/0183233 A1 Jun. 29, 2017

Related U.S. Application Data

(60) Provisional application No. 62/348,954, filed on Jun. 12, 2016.

(51) Int. Cl.
*C25B 1/00* (2006.01)
*C01B 32/174* (2017.01)
*B82Y 40/00* (2011.01)
*B82Y 30/00* (2011.01)

(52) U.S. Cl.
CPC .............. *C25B 1/00* (2013.01); *C01B 32/174* (2017.08); *B82Y 30/00* (2013.01); *B82Y 40/00* (2013.01); *C01B 2202/06* (2013.01); *Y10S 977/746* (2013.01); *Y10S 977/752* (2013.01); *Y10S 977/847* (2013.01)

(58) Field of Classification Search
CPC ..... C25B 1/00; C01B 32/174; C01B 2202/06; Y10S 977/752; Y10S 977/746; B82Y 30/00; B82Y 40/00
See application file for complete search history.

(56) References Cited

U.S. PATENT DOCUMENTS

2010/0028681 A1* 2/2010 Dai ........................ B82Y 30/00 428/408

OTHER PUBLICATIONS

Mouna Moumene, Electrochemical functionalization as a promising avenue for glucose oxidase immobilization atcarbon nanotubes: enhanced direct electron transfer process, International Journal of Electrochemical Science, Feb. 2013, vol. 8, pp. 2009-2022.
Kannan Balasubramanian, Electrochemically functionalized carbon nanotubes for device applications, Journal of Materials Chemistry, Mar. 2008, vol. 18, Issue 26, pp. 3071-3083.
Eugen Unger, Electrochemical functionalization of multi-walled carbon nanotubes for solvation and purification, Current Applied Physics, Oct. 2001, vol. 2, pp. 107-111.

(Continued)

*Primary Examiner* — Arun S Phasge
(74) *Attorney, Agent, or Firm* — Bajwa IP Law Firm; Haris Zaheer Bajwa

(57) ABSTRACT

A method for functionalizing carbon-based nanomaterials that may include: preparing a first suspension including an electrolyte solution, an amine source, and a plurality of carbon-based nanomaterials that are dispersed in the first suspension; and subjecting the first suspension to an electrochemical reaction by placing the first suspension between two electrodes and applying a voltage between the electrodes for a predetermined amount of time to obtain functionalized carbon-based nanomaterials in a second suspension.

14 Claims, 10 Drawing Sheets

(56) References Cited

OTHER PUBLICATIONS

Natal'ya S. Komarova, Spectroscopic characterization of the electrochemical functionalization of single-walled carbon nanotubes in aqueous and organic media, Carbon, Oct. 2011, vol. 50, Issue 3, pp. 922-931.

Xin Zhan, Single-step electrochemical functionalization of double-walled carbon nanotube (DWCNT) membranes and the demonstration of ionic rectification, Nanoscale Research Letters, vol. 8, Issue 1, p. 279, 2013.

Kan Kan, Functionalization of multi-walled carbon nanotube for electrocatalytic oxidation of nitric oxide, Journal of Applied Electrochemistry, Mar. 2010, vol. 40, Issue 3, pp. 593-599.

* cited by examiner

FUNCTIONALIZATION OF CARBON-BASED NANOMATERIALS

CROSS REFERENCE TO RELATED APPLICATION

This application claims the benefit of priority from U.S. Provisional Patent Application Ser. No. 62/348,954, filed on Jun. 12, 2016, and entitled "FUNCTIONALIZATION OF NANOMATERIALS IN A WET MEDIA," which is incorporated herein by reference in its entirety.

TECHNICAL FIELD

The present disclosure generally relates to functionalizing carbon-based nanomaterials, and particularly to an electrochemical method for functionalizing carbon-based nanomaterials where nanomaterials are dispersed in the electrolyte solution.

BACKGROUND

Poor dispersion of carbon-based nanomaterials in different media is the biggest obstacle in their wide-spread application. Chemical functionalization is one of the most common methods to increase nanomaterials' dispersibility and for forming a homogeneous suspension. Despite relative improvement in dispersion, long processing time and low efficiency are two distinct disadvantages of utilizing this method. In addition, using strong acid solvents in chemical functionalization approaches damages the structure of nanomaterials and adversely impacts their extraordinary properties.

Electrochemical functionalization method with a relatively lower destructivity may be regarded as an alternative to chemical methods. Although this method causes less destruction on CNTs and has lower cost of equipment, its low efficiency is a drawback.

The low efficiency of electrochemical methods may be due to the fact that most electrochemical functionalization methods require an electrode to be made of nanomaterials. Since the fabricated electrode is made of compacted nanomaterials, functionalization occurs on a fairly thin layer of electrode. Therefore, a high proportion of nanomaterials remain intact during electrochemical functionalization, which results in a significant decrease in efficiency. There is, therefore, a need in the art for methods that improve the efficiency of the electrochemical functionalization method.

SUMMARY

An exemplary embodiment of the present disclosure relates to a method for functionalizing carbon-based nanomaterials. The method may include preparing a first suspension including an electrolyte solution, an amine source, and a plurality of carbon-based nanomaterials that may be dispersed in the first suspension, and subjecting the first suspension to an electrochemical reaction by placing the first suspension between two electrodes and applying a voltage between the electrodes for a predetermined amount of time to obtain functionalized carbon-based nanomaterials in a second suspension.

Exemplary embodiments may include one or more of the following features. According to an implementation, the method may further comprise filtering and drying the second suspension to obtain functionalized carbon-based nanomaterials powder. Also, the dispersion of the carbon-based nanomaterials in the first suspension may be done by using a mechanical agitation, an ultrasonic agitation, or combinations thereof.

According to some exemplary embodiments, the first suspension may further include a catalyst which may be sodium hydroxide (NaOH), potassium hydroxide (KOH), or combinations thereof.

The carbon-based nanomaterials may be selected from carbon nano tubes (CNT), single-walled carbon nanotube (SWCNT), multi-walled carbon nanotube (MWCNT), graphite, graphene, fullerene, carbon nanofibers, or combinations thereof.

According to some exemplary embodiments, the electrolyte solution may include halide compounds that may be selected from sodium chloride (NaCl), potassium chloride (KCl), sodium bromide (NaBr), potassium iodide (KI), lithium chloride (LiCl), copper (II) chloride ($CuCl_2$), silver chloride (AgCl), calcium chloride ($CaCl_2$), chlorine fluoride (ClF), organohalides, Bromomethane ($CH_3Br$), Iodoform ($CHI_3$), hydrochloric acid (HCl), or combination thereof. Moreover, the amine source may be selected from primary amines, secondary amines, tertiary amines, cyclic amines, or combinations thereof.

According to an exemplary embodiment, placing the first suspension between the two electrodes may include providing an electrochemical cell including a vessel and two electrodes, and pouring the first suspension into the vessel. The two electrodes may be placed inside of the vessel.

According to some exemplary embodiments, the two electrodes may be placed at a distance of between about 1 and about 5 centimeters from one another. Moreover, the electrodes may be made of a material, such as graphite, electrical conductors, semi-conductors, metal, iron, copper, or combinations thereof. Moreover, the voltage between the electrodes may be in a range of between about 5 Volt and about 50 Volt.

DETAILED DESCRIPTION

Disclosed herein is an exemplary method for functionalizing carbon-based nanomaterials in an electrochemical reaction. Instead of forming an electrode out of the carbon-based nanomaterials that need to be functionalized, and then utilizing that electrode to form an electrochemical cell, as is conventionally done. On the other hand, a method consistent with exemplary embodiments of the present disclosure comprises carbon-based nanomaterials that may be dispersed within an electrolyte solution and two common electrodes may be utilized to form the electrochemical cell.

The stability of the dispersion of the carbon-based nanomaterials in the electrolyte solution may be ensured by subjecting the dispersion to agitation, e.g., mechanical agitation or ultrasonic agitation, during the electrochemical reaction. Benefits from these features may include, but are not limited to, a high-efficiency functionalization of carbon-based nanomaterials due to a better contact between the carbon-based nanomaterials and the functionalization agent, i.e. source of the functional groups.

Figure 1:
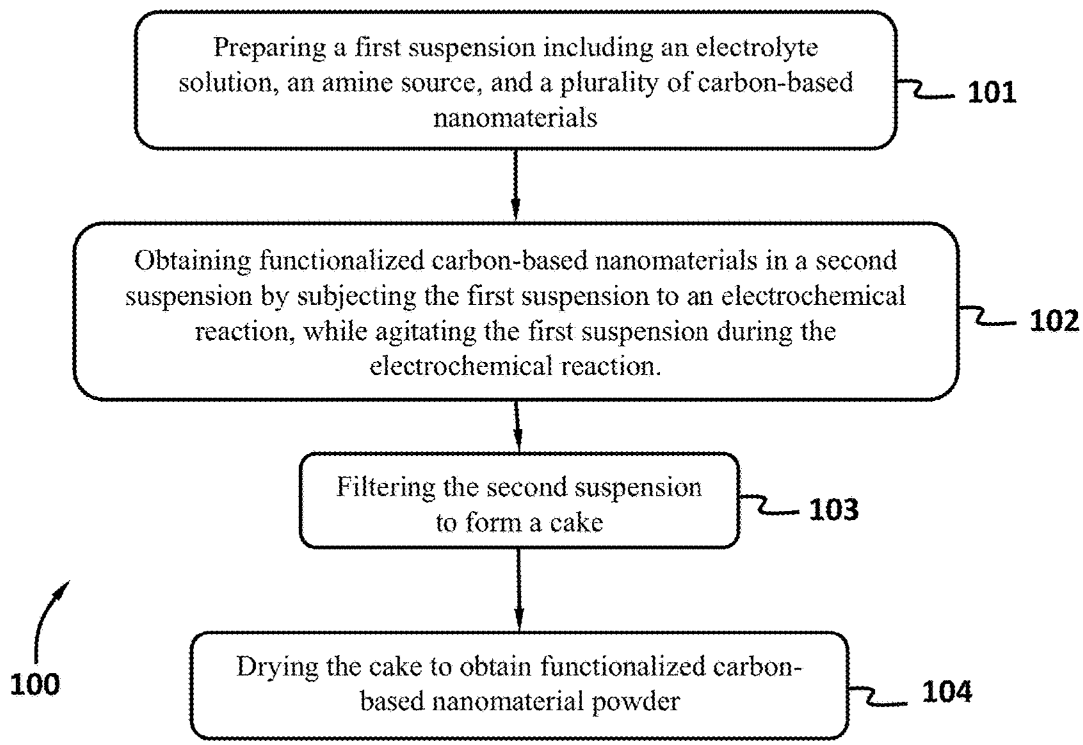
FIG. 1 illustrates a method for functionalizing carbon-based nano materials, consistent with exemplary embodiments of the present disclosure.

FIG. 1 is a flowchart of method 100 for the functionalization of carbon-based nanomaterials, consistent with exemplary embodiments of the present disclosure. Method 100 may include preparing a first suspension that may include an electrolyte solution, an amine source, and a plurality of carbon-based nanomaterials (step 101), and subjecting the first suspension to an electrochemical reaction while being agitated in order to obtain functionalized carbon-based nanomaterials in a second suspension (step 102). Referring to FIG. 1, the method 100 may further include filtering the second suspension to form a cake (step 103), and drying the cake to obtain functionalized carbon-based nanomaterial powder (step 104).

Referring to FIG. 1, in an exemplary embodiment, step 101 may involve preparing the first suspension by mixing an electrolyte solution and an amine source; and after that dispersing a plurality of carbon-based nanomaterials into the mixture. In an exemplary embodiments, dispersing the carbon-based material may be carried out by mechanical agitation, ultrasonic agitation, or a combination thereof. In another exemplary embodiment, the first suspension may further include a catalyst which may be sodium hydroxide (NaOH), potassium hydroxide (KOH), or a combination thereof.

Referring to step 101, the electrolyte solution may be prepared by dissolving a plurality of halide compounds in a polar solvent, for example either aqueous solvents or organic solvents to form an electrolyte solution with a concentration of, for example, between about 5 to about 50 percent by volume of the solvent.

According to an exemplary embodiment, the halide compounds may be sodium chloride (NaCl), potassium chloride (KCl), sodium bromide (NaBr), potassium iodide (KI), lithium chloride (LiCl), copper (II) chloride ($CuCl_2$), silver chloride (AgCl), calcium chloride ($CaCl_2$), chlorine fluoride (ClF), organohalides, Bromomethane ($CH_3Br$), Iodoform ($CHI_3$), hydrochloric acid (HCl), or combinations thereof.

According to an exemplary embodiment, the amine source may include primary amines, secondary amines, tertiary amines, cyclic amines, or combinations thereof. The primary amines may be selected from methylamine, ethylamine, amino acids, aniline, etc. The secondary amines may be selected from dimethyl amine, diethyl amine, diphenylamine, etc. The tertiary amines may be selected from trimethyl amine, N,N,N,N-tetramethyl-1,4-butanediamine, 1,6-diaminohexane-N,N,N,N-tetraacetic acid, 1,3,5-Trimethylhexahydro-1,3,5-triazine, etc.

With further reference to step 101 of FIG. 1, the molar ratio of the amine source to the carbon-based nanomaterial in the first suspension may be between about 0.5 and about 2. In some exemplary embodiments, the carbon-based nanomaterial may be selected from carbon nano tubes (CNT), single-walled carbon nanotube (SWCNT), multi-walled carbon nanotube (MWCNT), graphite, graphene, fullerene, carbon nanofibers, or combinations thereof.

In step 102, the first suspension may be subjected to an electrochemical reaction while being agitated to obtain functionalized carbon-based nanomaterial in a second suspension. The electrochemical reaction may be carried out in an electrochemical cell.

Figure 2:
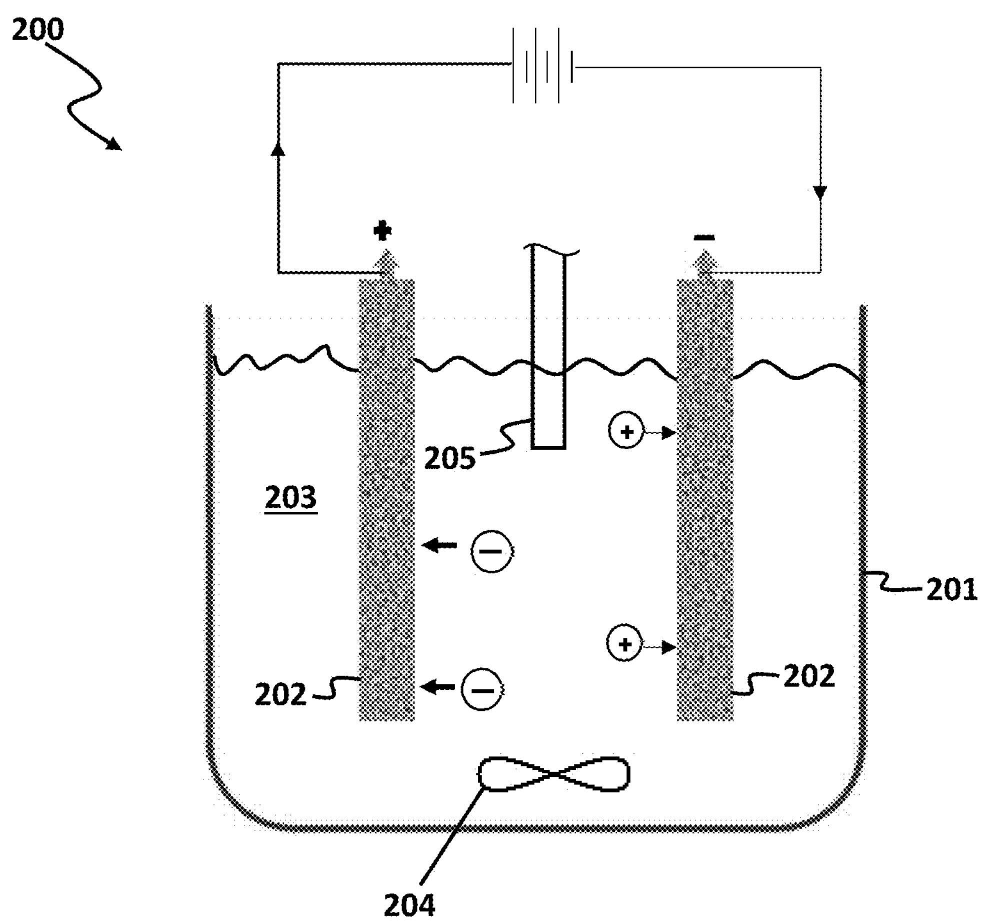
FIG. 2 illustrates an electrochemical cell, consistent with exemplary embodiments of the present disclosure.

FIG. 2 illustrates an an electrochemical cell 200, which includes a vessel 201, and two graphite electrodes 202, consistent with exemplary embodiments of the present disclosure. The first suspension 203 may be poured inside the vessel 201 between the two electrodes 202. A voltage may be applied between the electrodes 203 for the electrochemical reaction to occur inside the electrochemical cell 200. During the electrochemical reaction, agitation may be provided inside the vessel 201 by a mechanical agitator 204, an ultrasound agitator 205, or a combination thereof.

According to exemplary embodiments, the applied voltage between the electrodes 202 of the electrochemical cell 200 may be in an amount of about 5 Volt to 50 Volt. Moreover, the voltage may be applied for a predetermined amount of time, for example about 20 minutes to 90 minutes.

Furthermore, step 103 may involve filtering the second suspension that includes functionalized carbon-based nanomaterials in order to form a cake-like product. Filtering the second suspension may be carried out by centrifugal filtration, glass fiber filtration, membrane filtration, paper filtration, vacuum filtration, or combinations thereof.

Referring to step 103, after filtering the second suspension, in order to adjust the pH of the second suspension to about 7, the second suspension may be washed by distilled water several times to remove the remaining catalyst and neutralizing the second suspension. In step 104, in some exemplary embodiments, the obtained cake-like product of step 103 may be dried at room temperature for two or three days to obtain functionalized carbon-based nanomaterial powder.

EXAMPLES

The following examples describe exemplary implementations of the exemplary method consistent with exemplary embodiments of the present disclosure for electrochemical functionalization of multi-walled carbon nanotube (MWCNTs) powder using ethylenediamine. The following examples further contract exemplary methods consistent with exemplary embodiments with a prior art method for microwave-assisted functionalization of MWCNTs and characterization tests performed on the functionalized MWCNTs to study and compare the existence and amount of amine groups on the surface of MWCNTs functionalized by these two methods.

Example 1: Electrochemical Functionalization of Carbon Nanotubes

In this example, multi-walled carbon nanotubes were functionalized using ethylenediamine in an electrochemical method, consistent with exemplary embodiments of the present disclosure.

The electrochemical functionalization of this example is done in an electrochemical cell similar to the electrochemical cell 200 of FIG. 2.

Referring to FIG. 2, a 500 ml beaker or vessel 201 with two graphite electrodes 202 was utilized to form the electrochemical reaction cell 200. The graphite electrodes 202 had a diameter of 3 centimeters and a length of 1 centimeter and they were placed inside the beaker with a distance of 25 millimeters from one another.

In this example, 50 milligrams of sodium chloride was dissolved in 200 milliliters of distilled water to prepare a saline solution as the electrolyte. After that, 150 milligrams of pristine multi-walled carbon nanotube (MWCNT) powder as the carbon-based nanomaterial, 30 milliliters of ethylenediamine as the amine source, and 15 milliliters of sodium hydroxide as the catalyst were added to the saline solution to obtain the first suspension. The MWCNT powder was dispersed in the first suspension by stirring with a magnetic stirrer. During the reaction, the vessel was covered by an aluminum foil in order to minimize the evaporation rate of ethylenediamine.

The first suspension was then transferred to the electrochemical cell 200 and a constant voltage of 15 Volt was applied to the graphite electrodes 202 for 45 minutes to obtain a second suspension. The resultant second suspension was cooled down to ambient temperature and was filtered by a polytetrafluoroethylene (PTFE) membrane with a pore size of 0.2 μm to obtain a cake.

After that, the cake was washed several times using distilled water and ethanol in order to ensure complete removal of the excess ethylenediamine. Finally, the cake was dried for 72 hours at room temperature to obtain electrochemically functionalized MWCNTs (hereinafter EF-CNT sample).

Figure 3A:
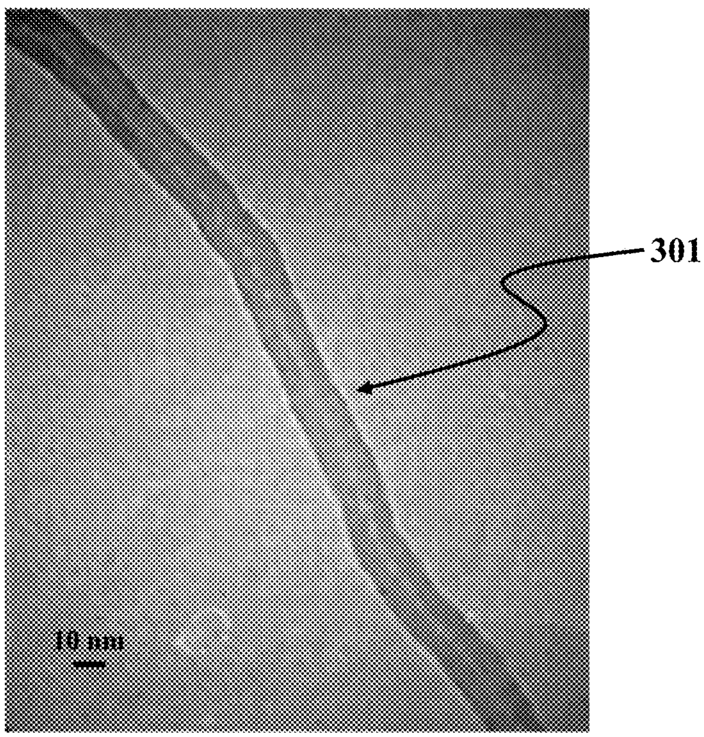
FIG. 3A illustrates a transmission electron microscope (TEM) image of a pristine multi-walled carbon nanotube (MWCNT) sample, consistent with exemplary embodiments of the present disclosure.
Figure 3B:
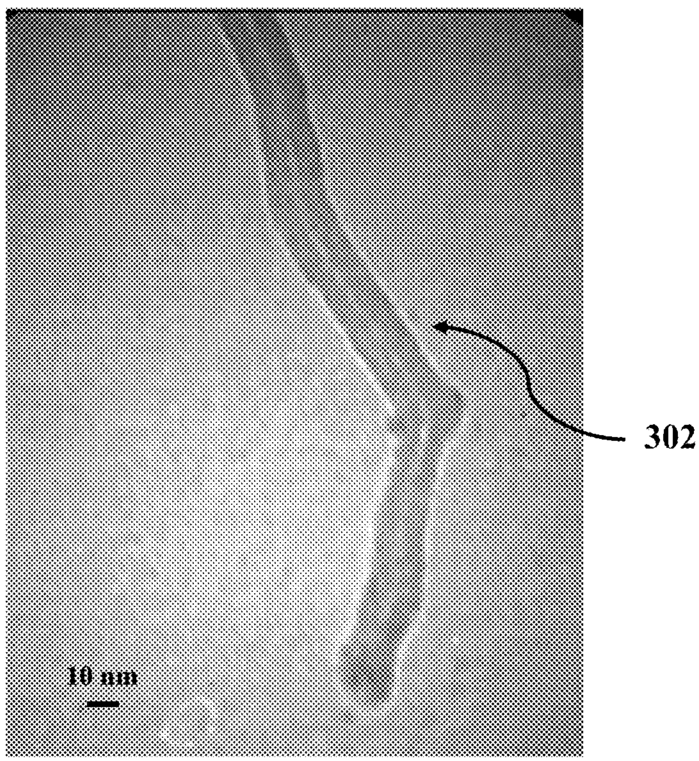
FIG. 3B illustrates a transmission electron microscope (TEM) image of an electrochemical functionalized MWCNT (EF-CNT) sample, consistent with exemplary embodiments of the present disclosure.

FIG. 3A illustrates a transmission electron microscopy (TEM) image of the pristine MWCNT sample 301. The pristine MWCNT has a cylindrical structure with a smooth surface; also, the MWCNT 301 has a diameter of about 22±5 nanometers. FIG. 3B illustrates a transmission electron microscopy (TEM) image of the electrochemical functionalized MWCNT (EF-CNT) sample 302, which has a cylindrical structure with a smooth surface and a diameter of about 22±5 nanometers.

Referring to FIGS. 3A and 3B, the smooth surface of the MWCNT in the EF-CNT sample 302 indicates that the functionalization of MWCNT in the electrochemical functionalization did not cause much damage to the structure of MWCNT of the sample in comparison to the pristine MWCNT sample 301 of FIG. 3A.

Moreover, the same diameter of the MWCNTs of the pristine MWCNT 301 sample of FIG. 3A, and EF-CNT sample 302 of FIG. 3B indicates the absence of any significant defects in the MWCNT structure as a result of electrochemical functionalization.

Example 2: Microwave-Assisted Functionalization of Carbon Nanotubes

In this example, a prior art method was used for functionalization of carbon nanotubes using ethylenediamine. At first, 200 milligrams of pristine MWCNT powder, 200 milliliters of sodium nitrite, and 20 milliliters of ethylenediamine were mixed and sonicated for 30 minutes at 50° C. to prepare a first suspension.

The first suspension was then transferred to a pressure gauge-equipped reactor and it was exposed to microwave radiation at 500 Watts for 15 minutes at a temperature of 90° C. to obtain a second suspension. The resultant second suspension was cooled down to ambient temperature and it was filtered by a polytetrafluoroethylene (PTFE) membrane to obtain a cake. The cake was washed several times using distilled water and ethanol in order to ensure complete removal of the excess ethylenediamine. After that, the cake was dried for about 72 hours at room temperature to obtain microwave functionalized MWCNTs (hereinafter MF-CNT).

Figure 3C:
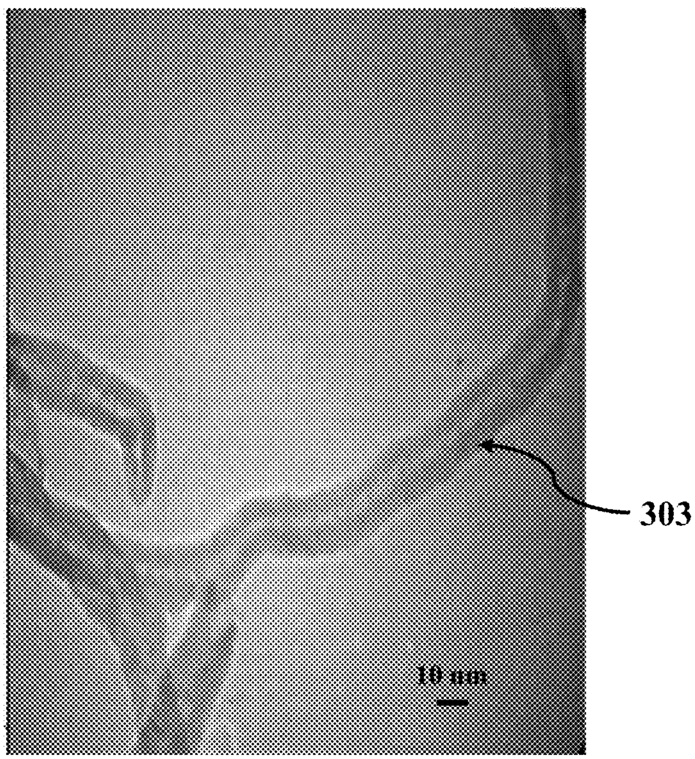
FIG. 3C illustrates a transmission electron microscope (TEM) image of an exemplary microwave-functionalized MWCNT (MF-CNT) sample, consistent with exemplary embodiments of the present disclosure.

FIG. 3A illustrates a transmission electron microscopy (TEM) image of the pristine MWCNT sample 301. The pristine MWCNT has a cylindrical structure with a smooth surface; also, the MWCNT 301 has a diameter of about 22±5 nanometers. FIG. 3C illustrates a transmission electron microscopy (TEM) image of the microwave functionalized MWCNT (MF-CNT) sample 303, which has a cylindrical structure with a smooth surface and a diameter 303 of about 22±5 nanometers.

Referring to FIG. 3A and FIG. 3C, the smooth surface of the MWCNT in the MF-CNT sample 303 indicates that the functionalization of MWCNT in the microwave-assisted method did not cause much damage to the structure of MWCNT of the samples in comparisons to the pristine MWCNT sample 301 of FIG. 3A. Moreover, the same diameter of the MWCNTs of the pristine MWCNT sample 301 of FIG. 3A, and MF-CNT sample 303 of FIG. 3C indicates the absence of any significant defects in the MWCNT structure as a result of microwave-assisted functionalization method.

Example 3: Fourier Transform Infrared (FT-IR) Spectroscopy

Figure 4:
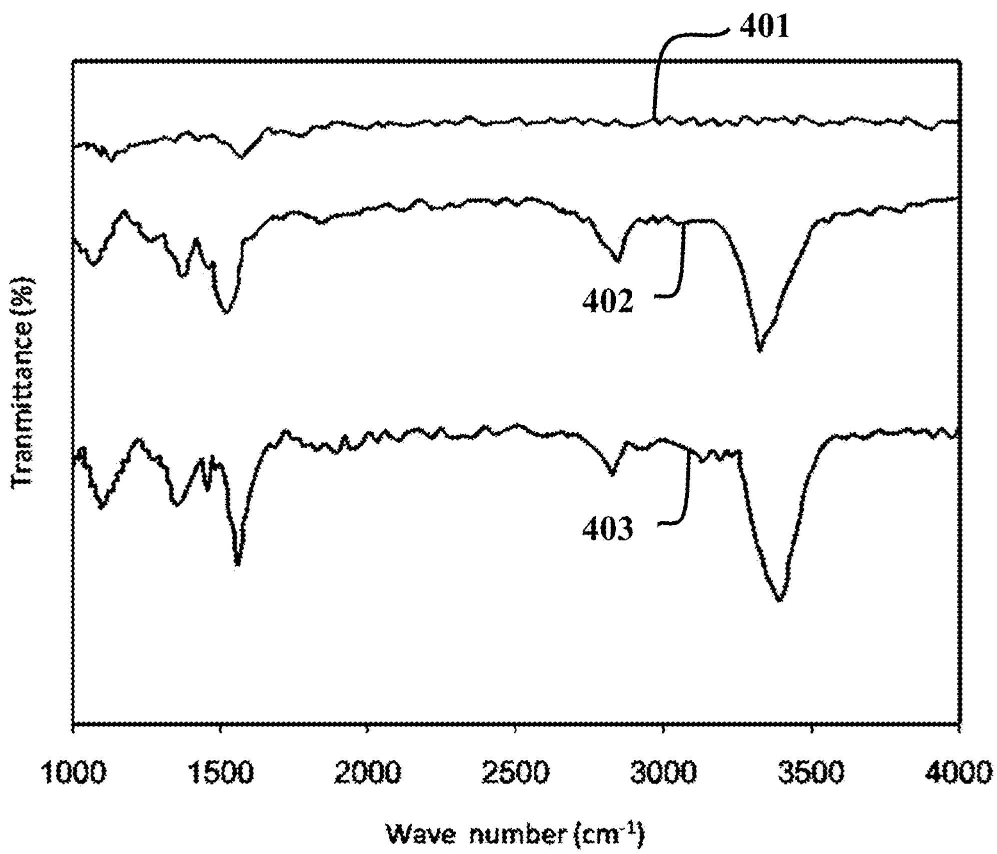
FIG. 4 illustrates Fourier transform infrared (FT-IR) spectra for pristine MWCNT sample, MF-CNT sample, and EF-CNT sample, as described in detail in connection with example 3.

In this example, in order to demonstrate the amination of MWCNTs using ethylenediamine in EF-CNT and MF-CNT samples, an FT-IR spectroscopy analysis was performed. FIG. 4 illustrates the FT-IR spectra that were obtained for pristine MWCNT sample 401, MF-CNT sample 402, and EF-CNT sample 403.

Referring to FIG. 4, in contrast to pristine MWCNTs spectrum 401, the spectra for MF-CNTs 402 and EF-CNTs 403 display some new peaks that should be attributed to amine groups. The bands shown around 3500-3200 $cm^{-1}$ can be assigned to N—H functional groups. The presence of N—H absorption band in the samples of MF-CNT 402 and EF-CNT 403 may be an indication of successful attachment of amine groups onto the surface of the MWCNTs.

Another clear peak which is observed in the spectra of MF-CNT sample 402 and EF-CNT sample 403, is in the range of 3000-2700 $cm^{-1}$. On the other hand, in aliphatic compounds, $sp^3$ hybridized carbon absorption normally occurs at wave numbers lower than 3000 $cm^{-1}$; therefore, the peak at wave number around 2900 $cm^{-1}$ in the spectra of the two samples MF-CNT 402 and EF-CNT 403, is the result of stretching vibrations of C—H bonds of the amine functional groups, which were attached onto the surface of the MWCNTs.

Referring again to FIG. 4, two other peaks in the 1350-1100 $cm^{-1}$ and 1650-1450 $cm^{-1}$ regions were observed in the FT-IR spectra. For all amines, the stretching absorption of C—N appears as peaks at around 1100-1350 $cm^{-1}$ wave numbers; therefore, the peak that is formed near 1200 $cm^{-1}$ in the spectra of MF-CNTs 402 and EF-CNTs 403 can indicate the formation of a C—N bond. The 1450-1650 $cm^{-1}$ spectral region, where the second peak is observed, is related to stretching vibrations of the C—C bonds. In addition to the peak of the C—N bonds, the peak of the C—C bonds provides another evidence confirming the presence of amine groups.

Example 4: Thermo-Gravimetric Analysis (TGA)

In this example, thermal stability and characteristic decomposition pattern of pristine MWCNT sample, MF-CNT sample, and EF-CNT sample were determined in a thermo-gravimetric analysis (TGA). In this analysis, decomposition and changes in weight of pristine MWCNT, MF-CNT, and EF-CNT samples were measured as a function of increasing temperature with a constant heating rate.

Figure 5:
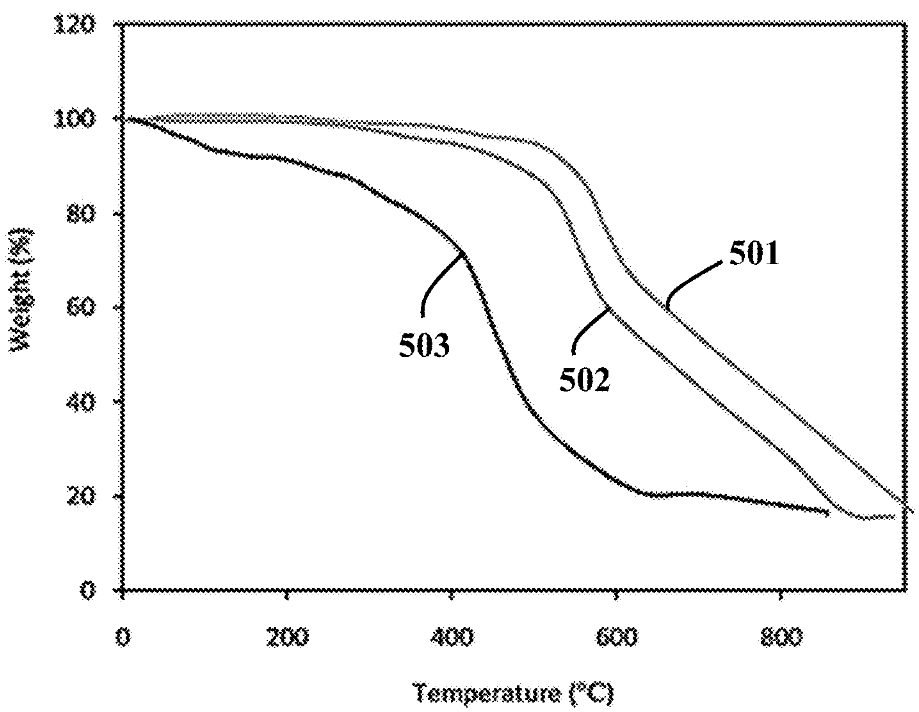
FIG. 5 illustrates thermo-gravimetric analysis (TGA) results of pristine MWCNT sample, MF-CNT sample, and EF-CNT sample, as described in detail in connection with example 4.

FIG. 5 illustrates the TGA results of pristine MWCNT sample 501, MF-CNT sample 502, and EF-CNT sample 503. As seen in the thermograms, ranges of the weight loss temperature of the functionalized samples MF-CNT 502 and EF-CNT 503 are different from those of pristine CNT 501. In the TGA thermogram for pristine CNT 501, a weight loss corresponding to the decomposition of MWCNTs occurs at a temperature about 500° C.

Referring to FIG. 5, in contrast to pristine CNT 501, TGA thermograms of MF-CNT (502) and EF-CNT 503 display a weight loss at relatively lower temperatures. Weight loss in temperatures between 100° C. to 350° C. can indicate the presence of amine groups; therefore, the weight loss observed in this range is likely due to the decomposition of the attached amine groups on CNTs.

Figure 6:
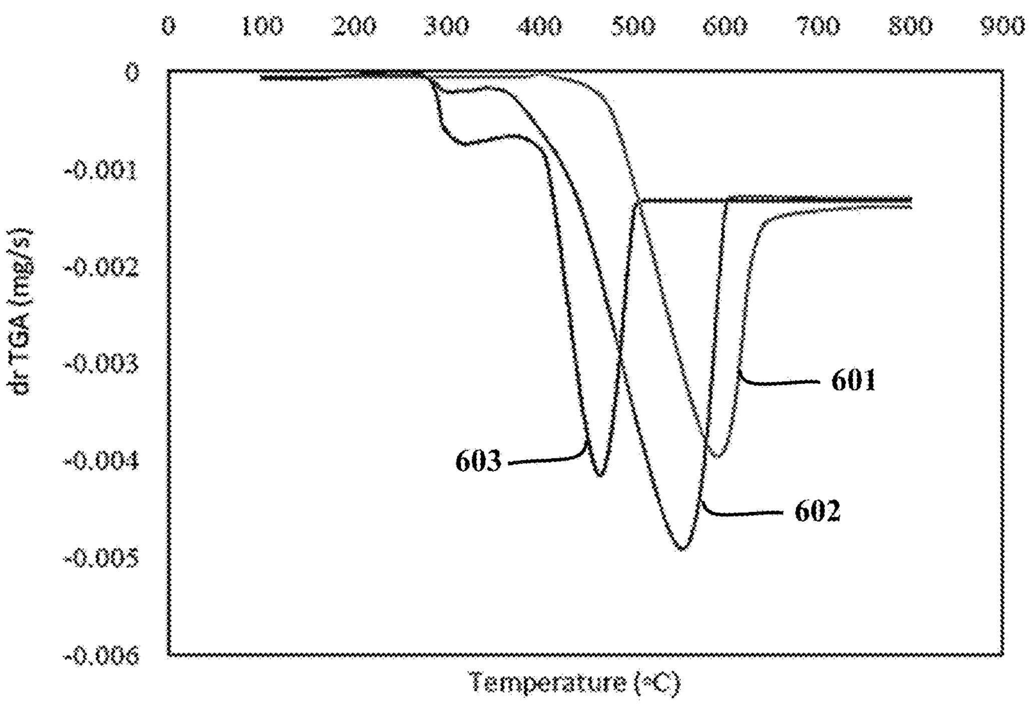
FIG. 6 illustrates derivative TGA curves for pristine MWCNT, MF-CNT, and EF-CNT samples, as described in detail in connection with example 4.

FIG. 6 illustrates derivative TGA curves, which allow a more precise comparison between the thermal stability of pristine MWCNT 601, MF-CNT 602, and EF-CNT 603 samples. There is a marked decline in the weight of the samples between 400 and 600° C., corresponding to the decomposition of the carbon body of MWCNTs that has occurred at this temperature range.

Referring to FIG. 6, the pristine MWCNT sample 601 began to decompose at 600° C., whereas the onset temperature of decomposition and weight loss has dramatically shifted to lower temperatures in the functionalized samples MF-CNT 602, which is about 555° C., and EF-CNT 603, which is about 464° C. This drop in the decomposition onset temperature of the functionalized samples MF-CNT 602, and EF-CNT 603 can be attributed to the functional groups. In other words, thermal stability of carbon nanotubes is decreased due to the functionalization by attaching amine groups on the surface of the MWCNTs.

Referring again to FIG. 6, another distinct difference between the pristine and the functionalized samples is the presence of a peak at a temperature between 200 and 350° C. In contrast to pristine CNT sample 601, the functionalized samples MF-CNT 602 and EF-CNT 603 display a peak in this range of temperatures that is another indication of successful attachment of amine groups on the surface of MWNCTs.

Example 5: Ultraviolet-Visible (UV-Vis) Spectroscopy

Figure 7:
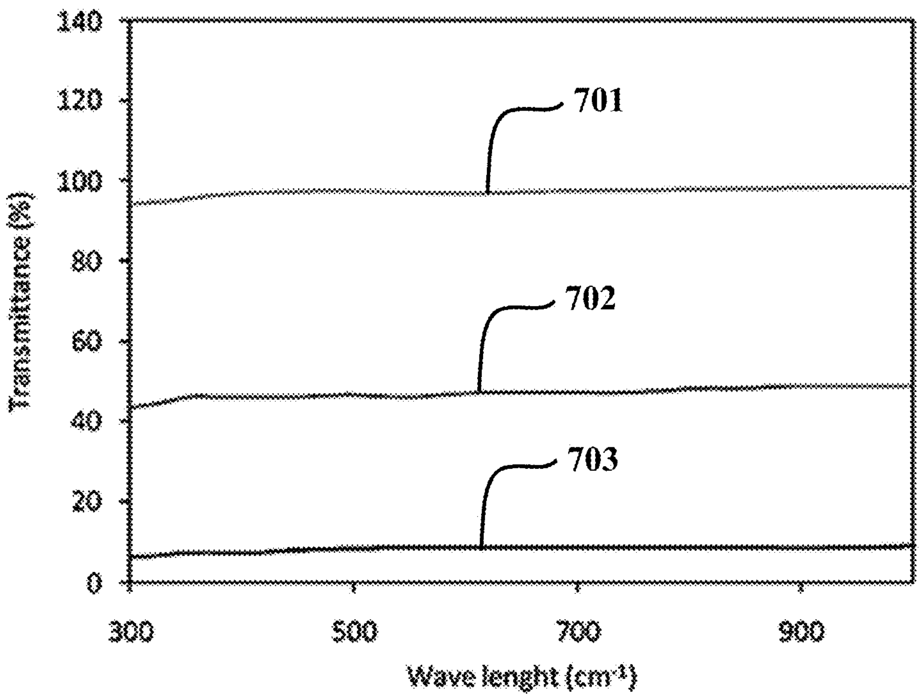
FIG. 7 illustrates the transmittance mode of ultraviolet-visible spectroscopy (UV-Vis) spectra of pristine MWCNT sample, MF-CNT sample, and EF-CNT sample, as described in detail in connection with example 5.

In this example, in order to study the dispersion and transparency of MWCNTs, ultraviolet-visible (UV-Vis) spectroscopy was performed. FIG. 7 illustrates the transmittance mode of UV-Vis spectra of pristine MWCNT sample 701, MF-CNT sample 702, and EF-CNT sample 703 through dispersion of each sample MWCNTs in water.

The transmittance of pristine MWCNT sample 701 was about 95%; therefore, it can be deduced that the pristine MWCNT sample 701 was not well-dispersed in the solvent and it is eventually bound to precipitate. This observation was expected since the pristine MWCNT sample was without any functional groups such as amine groups which increase the solubility of the MWCNTs in water.

It is quite clear that the transmittance percentage of the MF-CNT sample 702, which is about 45% and the transmittance percentage of EF-CNT sample 703, which is about 8% is not as high as that of pristine MWCNT 701, which is about 95%; and their lower percentage of transmittance is most probably related to their amine groups.

Moreover, considering the lower transmittance of the EF-CNT sample 703 as compared with MF-CNT sample 702, it can be concluded that the electrochemical functionalization method has a higher functionalization efficiency than microwave-assisted method.

Example 6: Raman Spectroscopy

In this example, Raman spectroscopy was carried out on the pristine MWCNT sample, MF-CNT sample, and EF-CNT sample in order to acquire a deeper understanding of the structural changes that MWCNTs undergo during the functionalization process.

Figure 8:
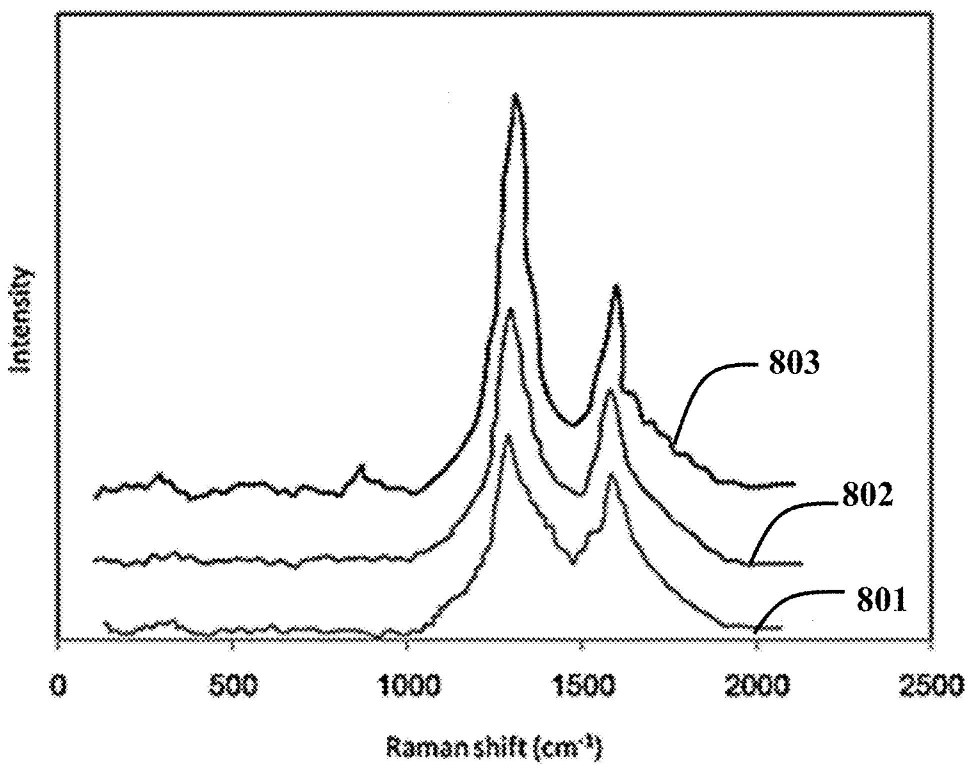
FIG. 8 illustrates Raman spectra of pristine MWCNT sample and functionalized samples of MF-CNT and EF-CNT, described in detail in connection with example 6.

FIG. 8 illustrates the Raman spectra of pristine MWCNT sample 801 and functionalized samples of MF-CNT 802 and EF-CNT 803. In the Raman spectra of each sample, the intensity of Raman scattered radiation was measured as a function of its frequency difference from the incident radiation which is called the Raman shift.

Referring to FIG. 8, the peak at about 1603 $cm^{-1}$ Raman shift, which is a G-band, is associated with graphite carbon, while the peak at about 1306 $cm^{-1}$ Raman shift, which is a D-band, is an indicative of amorphous carbons of attached functional groups onto the surface of the MWCNTs. The intensity of Raman scattered radiation in G-band is called $I_G$, and the intensity of Raman scattered radiation in D-band is called $I_D$.

In functionalization studies, a higher $I_D/I_G$ maybe due to disruption in aromatic π electrons of MWCNTs' surface as a reason of more functional groups attached to the surface of MWCNTs. Referring again to FIG. 8, the $I_D/I_G$ of Raman spectrum of each sample was determined. In the case of pristine MWCNT sample 801 the $I_D/I_G$ is about 1.21; however, the $I_D/I_G$ of MF-CNT sample 802 is about 1.55, and the ratio of $I_D/I_G$ of EF-CNT sample 803 is about 2.00.

As a result, the number of $I_D/I_G$ increases for the functionalized sample of MF-CNT 702, and EF-CNT 803 due to the presence of amine groups on the surface of the MWCNTs. Also, the ratio of $I_D/I_G$ in EF-CNT sample 803 is higher than the $I_D/I_{G\ ratio}$ in MF-CNT sample 802; therefore, the EF-CNT sample has more functional groups on MWCNTs' surface than MF-CNT sample, and it indicates that the exemplary electrochemical functionalization method has a higher functionalization efficiency than a microwave-assisted method.

What is claimed is:

1. A method for functionalizing carbon-based nanomaterials, comprising:

preparing a first suspension, wherein the first suspension includes an electrolyte solution, an amine source, and a plurality of carbon-based nanomaterials, the plurality of carbon-based nanomaterials dispersed in the first suspension, wherein the carbon-based nanomaterials are dispersed in the first suspension by using an agitation method from one of mechanical agitation or ultrasonic agitation;

obtaining functionalized carbon-based nanomaterials in a second suspension by subjecting the first suspension to an electrochemical reaction, the obtaining comprising:

placing the first suspension between two electrodes; and applying a voltage between the two electrodes for a predetermined amount of time, wherein the first suspension is subjected to agitation during the electrochemical reaction;

filtering the second suspension to obtain functionalized carbon-based nanomaterials cake; and drying the functionalized carbon-based nanomaterials cake to obtain functionalized carbon-based nanomaterials powder.

2. A method for functionalizing carbon-based nanomaterials, comprising:

preparing a first suspension, wherein the first suspension includes an electrolyte solution, an amine source, and a plurality of carbon-based nanomaterials, the plurality of carbon-based nanomaterials dispersed in the first suspension; and obtaining functionalized carbon-based nanomaterials in a second suspension by subjecting the first suspension to an electrochemical reaction, the obtaining comprising:

placing the first suspension between two electrodes; and applying a voltage between the two electrodes for a predetermined amount of time, wherein the first suspension is subjected to agitation during the electrochemical reaction.

3. The method according to claim 2, further comprising filtering the second suspension to obtain functionalized carbon-based nanomaterials cake.

4. The method according to claim 3, further comprising the drying functionalized carbon-based nanomaterials cake to obtain functionalized carbon-based nanomaterials powder.

5. The method according to claim 2, wherein the carbon-based nanomaterials are dispersed in the first suspension by using an agitation method consisting of mechanical agitation, ultrasonic agitation, and combinations thereof.

6. The method according to claim 2, wherein the first suspension further includes a catalyst.

7. The method according to claim 6, wherein the catalyst is one of sodium hydroxide (NaOH), potassium hydroxide (KOH), and combinations thereof.

8. The method according to claim 2, wherein the electrolyte solution include halide compounds consist of one or more of sodium chloride (NaCl), potassium chloride (KCl), sodium bromide (NaBr), potassium iodide (KI), lithium chloride (LiCl), copper (II) chloride (CuCl2), silver chloride (AgCl), calcium chloride (CaCl2), chlorine fluoride (ClF), organohalides, Bromomethane (CH3Br), Iodoform (CHI3), hydrochloric acid (HCl), and combinations thereof.

9. The method according to claim 2, wherein the amine source is one of primary amines, secondary amines, tertiary amines, cyclic amines, and combinations thereof.

10. The method according to claim 2, wherein the carbon-based nanomaterials is one of carbon nano tubes (CNT), single-walled carbon nanotube (SWCNT), multi-walled carbon nanotube (MWCNT), graphite, graphene, fullerene, carbon nanofibers, and combinations thereof.

11. The method according to claim 2, wherein the voltage is in a range of between 5 Volt and 50 Volt.

12. The method according to claim 2, wherein the two electrodes are placed at a distance in a range of between 1 and 5 centimeters from one another.

13. The method according to claim 2, wherein the electrodes are made of a material of graphite, electrical conductors, semi-conductors, metal, iron, copper, and combinations thereof.

14. The method according to claim 2, wherein placing the first suspension between the two electrodes comprises:

providing an electrochemical cell including a vessel, wherein the two electrodes are placed inside the vessel; and pouring the first suspension into the vessel.

* * * * *